(12) United States Patent
Huang et al.

(10) Patent No.: US 12,547,140 B2
(45) Date of Patent: Feb. 10, 2026

(54) STACKING PLAN CREATING METHOD

(71) Applicant: KOBE STEEL, LTD., Hyogo (JP)

(72) Inventors: Shuo Huang, Hyogo (JP); Satoshi Chikaguchi, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 426 days.

(21) Appl. No.: 18/250,959

(22) PCT Filed: Oct. 11, 2021

(86) PCT No.: PCT/JP2021/037635
§ 371 (c)(1),
(2) Date: Apr. 27, 2023

(87) PCT Pub. No.: WO2022/091762
PCT Pub. Date: May 5, 2022

(65) Prior Publication Data
US 2024/0019832 A1    Jan. 18, 2024

(30) Foreign Application Priority Data

Oct. 28, 2020    (JP) .................................. 2020-180780

(51) Int. Cl.
*G05B 19/042*    (2006.01)
*B33Y 50/02*    (2015.01)

(52) U.S. Cl.
CPC .......... *G05B 19/0426* (2013.01); *B33Y 50/02* (2014.12)

(58) Field of Classification Search
CPC ............ G05B 19/0426; G05B 19/4099; B33Y 50/02; G06F 30/17; G06F 30/20; G06F 2113/10; G06F 2119/18; B22F 10/22; B22F 10/38; B22F 10/385; B22F 10/85; B22F 10/25; B23K 9/04; B23K 9/042; Y02P 10/25; B29C 64/118; B29C 64/393
See application file for complete search history.

(56) References Cited

U.S. PATENT DOCUMENTS

| | | | |
|---|---|---|---|
| 2013/0228302 A1* | 9/2013 | Rickenbacher | B22F 10/64 164/492 |
| 2014/0232035 A1* | 8/2014 | Bheda | B29C 64/165 425/375 |
| 2017/0144370 A1* | 5/2017 | Moore | B29C 69/001 |
| 2018/0117696 A1* | 5/2018 | Tsuji | B23K 9/02 |

(Continued)

FOREIGN PATENT DOCUMENTS

JP      2010-201474 A    9/2010

*Primary Examiner* — Alicia M. Choi
(74) *Attorney, Agent, or Firm* — Studebaker Brackett PLLC

(57) ABSTRACT

A target shape is set from a three-dimensional shape data of an additively-manufactured object, and the set target shape is sliced into a plurality of bead models having shapes corresponding to weld beads. A dripping amount of a filler metal to a lower layer during bead formation in a bead deposition portion where the sliced bead models overlap vertically is predicted according to welding conditions of the weld beads. A bead height of each bead model in the bead deposition portion is modified according to the predicted dripping amount. A deposition plan to manufacture the additively-manufactured object is created by using the plurality of bead models including the bead model with modified bead height.

7 Claims, 15 Drawing Sheets

(56) References Cited

U.S. PATENT DOCUMENTS

| | | | | |
|---|---|---|---|---|
| 2018/0178304 A1* | 6/2018 | Pucek | ............... | B23K 9/044 |
| 2018/0304550 A1* | 10/2018 | Atherton | ............ | G05B 19/29 |
| 2018/0311769 A1* | 11/2018 | TenHouten | ........ | B23K 26/082 |
| 2020/0230886 A1* | 7/2020 | Takano | ............. | B33Y 30/00 |
| 2021/0237186 A1* | 8/2021 | Liu | ..................... | B23K 9/16 |
| 2021/0323071 A1* | 10/2021 | Mark | ................. | B22F 12/17 |
| 2022/0305725 A1* | 9/2022 | Lee | ................... | B33Y 50/02 |

\* cited by examiner (A)

(B)

STACKING PLAN CREATING METHOD

TECHNICAL FIELD

The present invention relates to a deposition plan creation method for an additively-manufactured object formed by depositing weld beads.

BACKGROUND ART

In recent years, needs for depositing using a 3D printer as a means of production are increased, and research and development has been carried out toward a practical use of depositing using slab metal materials. The 3D printer that deposits metal materials uses heat sources such as lasers, electron beams, and arcs to melt metal powder or metal wires and deposits the molten metals to manufacture an additively-manufactured object.

For example, Patent Literature 1 discloses a deposition design method in which a manufacturing process of an additively-manufactured object is evaluated by simulation, an optimum welding pass and welding conditions are adjusted, and a welding device is controlled under the adjusted conditions to perform depositing.

CITATION LIST

Patent Literature

Patent Literature 1: JP2010-201474A

SUMMARY OF INVENTION

Technical Problem

When a plurality of weld beads are deposited by arc welding, a weld bead may drip to a preceding layer due to gravity, and in that case, a bead height of the weld bead to be formed becomes lower than an expected height. Such dripping of the weld bead cannot be quantitatively predicted by the deposition design method according to Patent Literature 1, and thus, a shape of the completed additively-manufactured object sometimes deviates from a target shape.

Therefore, an object of the present invention is to provide a deposition plan creation method capable of performing highly accurate additive manufacturing in consideration of bead dripping when weld beads are deposited.

Solution to Problem

The present invention includes the following configurations.

A deposition plan creation method for creating a deposition plan in which a bead formation pass and a welding condition for weld beads obtained by melting and solidifying a filler metal when an additively-manufactured object is manufactured by depositing the weld beads are set, the deposition plan creation method including:
- setting a target shape from three-dimensional shape data of the additively-manufactured object;
- slicing the set target shape into a plurality of bead models having shapes corresponding to the weld beads;
- predicting, according to the welding condition of the weld beads, an amount of the filler metal that drips to a lower layer during bead formation in a bead deposition portion in which the bead models vertically overlap one another among the plurality of bead models;
- modifying a bead height of each of the bead models in the bead deposition portion according to the predicted dripping amount; and
- creating the deposition plan for manufacturing the additively-manufactured object using the plurality of bead models including the bead model with the modified bead height.

Advantageous Effects of Invention

According to the present invention, a deposition plan capable of performing highly accurate additive manufacturing in consideration of bead dripping when weld beads are deposited may be created.

DESCRIPTION OF EMBODIMENTS

Hereinafter, embodiments of the present invention will be described in detail with reference to the drawings.

<Manufacturing Apparatus for Additively-Manufactured Object>

Figure 1:
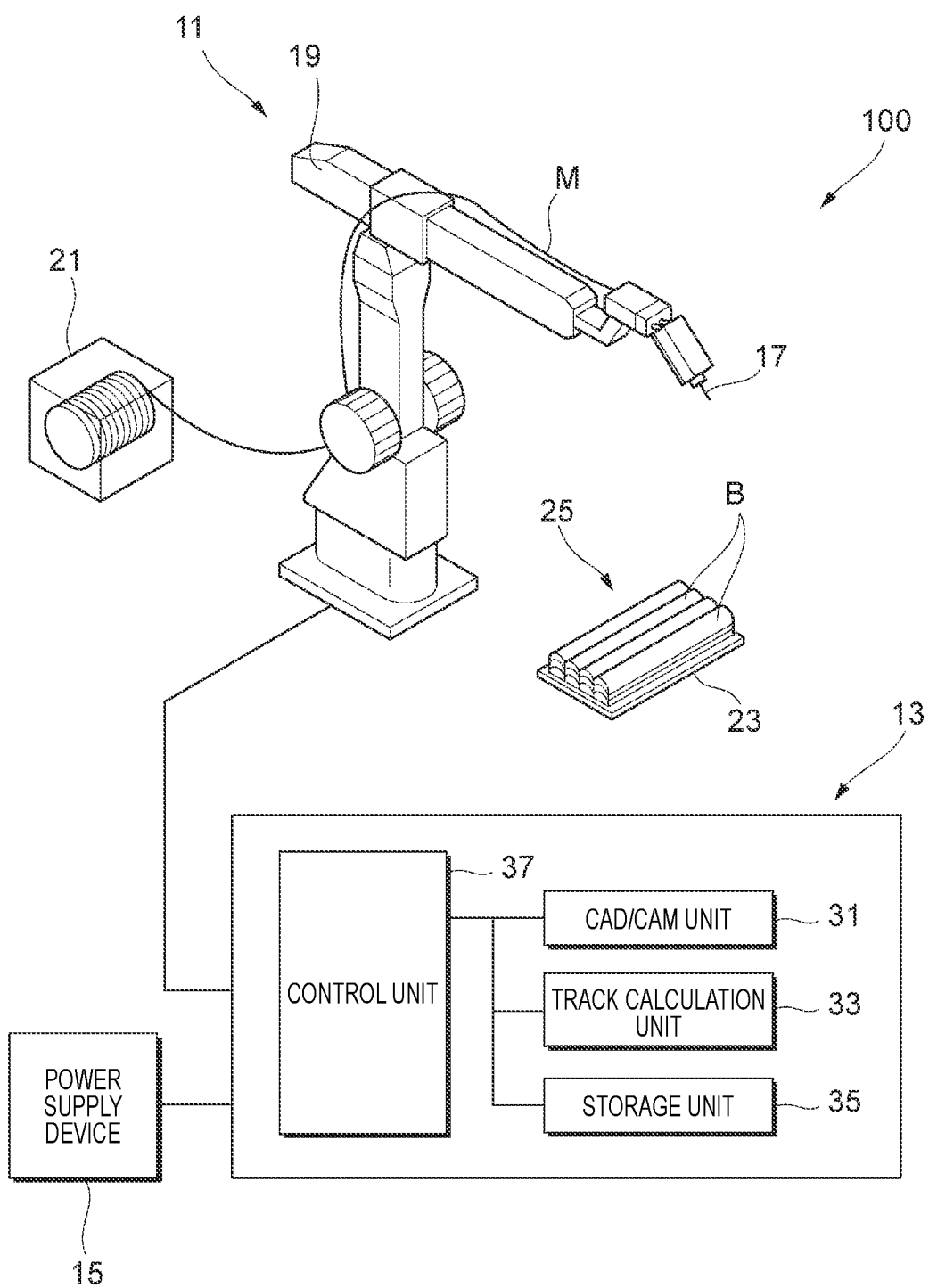
FIG. 1 is a schematic configuration diagram showing a manufacturing apparatus for an additively-manufactured object.

FIG. 1 is a schematic configuration diagram showing a manufacturing apparatus for an additively-manufactured object.

A manufacturing apparatus 100 for an additively-manufactured object having the present configuration includes an additive manufacturing device 11, a controller 13 that performs integrated control on the additive manufacturing device 11, and a power supply device 15. The additive manufacturing device 11 includes a welding robot 19 having a torch 17 on a tip shaft, and a filler metal feeding unit 21 that feeds a filler metal (welding wire) M to the torch 17. The additive manufacturing device 11 melts the filler metal M by an arc and solidifies it to form weld beads B on a base plate 23, and deposits the weld beads B sequentially to form an additively-manufactured object 25. The manufacturing apparatus 100 for an additively-manufactured object shown here is merely a configuration example, and may have another configuration.

The welding robot 19 is an articulated robot, and at the torch 17 attached to the tip shaft of a robot arm, the filler metal M is supported such that the filler metal can be continuously fed. A position or posture of the torch 17 can be arbitrarily set three-dimensionally within a range of the degree of freedom of the robot arm.

The torch 17 includes a shield nozzle (not shown), and shielding gas is fed from the shield nozzle. An arc welding method used here may be a consumable electrode type such as shielded metal arc welding and carbon dioxide gas arc welding or a non-consumable electrode type such as TIG welding and plasma arc welding, and is appropriately selected depending on an additively-manufactured object to be manufactured.

For example, in the case of the consumable electrode type, a contact tip is disposed inside the shield nozzle, and the filler metal M to which a melting current is supplied is held on the contact tip. While holding the filler metal M, the torch 17 generates an arc from a tip end of the filler metal M in a shielding gas atmosphere. The filler metal M is fed from the filler metal feeding unit 21 to the torch 17 by a delivery mechanism (not shown) attached to the robot arm or the like. Then, when the continuously fed filler metal M is melted and solidified while the torch 17 is moved, linear weld beads B, which are melted and solidified bodies of the filler metal M, are formed on the base plate 23, and the additively-manufactured object 25 including the weld beads B is manufactured.

The controller 13 includes a CAD/CAM unit 31, a track calculation unit 33, a storage unit 35, and a control unit 37 to which these units are connected. The controller 13 is implemented by a computer device including a CPU, memory, storage, and the like.

The CAD/CAM unit 31 inputs or creates three-dimensional shape data (CAD data or the like) of the additively-manufactured object 25 to be manufactured.

The track calculation unit 33 generates a shape model as a target shape based on the three-dimensional shape data, and slices the obtained shape model into a plurality of weld bead layers corresponding to heights of the weld beads B. Then, a deposition plan for determining a bead formation pass (a track of the torch 17 for forming the weld bead B) and welding conditions (including welding conditions or heating conditions or the like such as welding current and welding voltage for obtaining a bead width, a bead deposit height, and the like) for forming the weld bead B is created for each layer of the sliced shape model. That is, the shape model as the target shape is sliced into a plurality of bead models having shapes corresponding to the weld beads, and the bead formation pass and the welding conditions for each of the sliced bead models are determined. The created deposition plan is stored in the storage unit 35 as a drive program for driving each unit of the additive manufacturing device 11. The drive program may be created by another computer device other than the controller 13 by inputting required information to the other computer device. In this case, the created drive program is input to the storage unit 35 of the controller 13 via appropriate communication means such as LAN.

The base plate 23 is implemented by a metal plate such as a steel plate, and is basically larger than a bottom surface (lowermost layer surface) of the additively-manufactured object 25. The base plate 23 is not limited to a plate-like shape base, and may have another shape like a block-like or rod-like base.

Any commercially available welding wire can be used as the filler metal M. For example, MAG welding solid wires and MIG welding solid wires (JIS Z 3312) for mild steel, high tensile steel, and cryogenic steel, and arc welding flux-cored wires (JIS Z 3313) for mild steel, high tensile steel, and cryogenic steel can be used.

A heat source for melting the filler metal M is not limited to the above-described arc. The heat source using another method such as a heating method using an arc and a laser together, a heating method using plasma, or a heating method using an electron beam or a laser may be used. In the case of heating by an electron beam or a laser, a heating amount may be controlled more finely to keep each weld bead in a more proper state, thereby contributing to further improvement in quality of an additively-manufactured object.

According to the manufacturing apparatus 100 for an additively-manufactured object having the above configuration, the control unit 37 executes the drive program stored in the storage unit 35 to drive the welding robot 19 and the power supply device 15. That is, the controller 13 drives the welding robot 19 according to a procedure set in the drive program to move the torch 17 along the bead formation pass. As the torch 17 moves, the filler metal M is heated by the arc at a tip end of the torch, and the melted filler metal M is piled up on the base plate 27. Accordingly, the additively-manufactured object 25 in which the plurality of linear weld beads B are formed on the base plate 27 is obtained.

Figure 2:
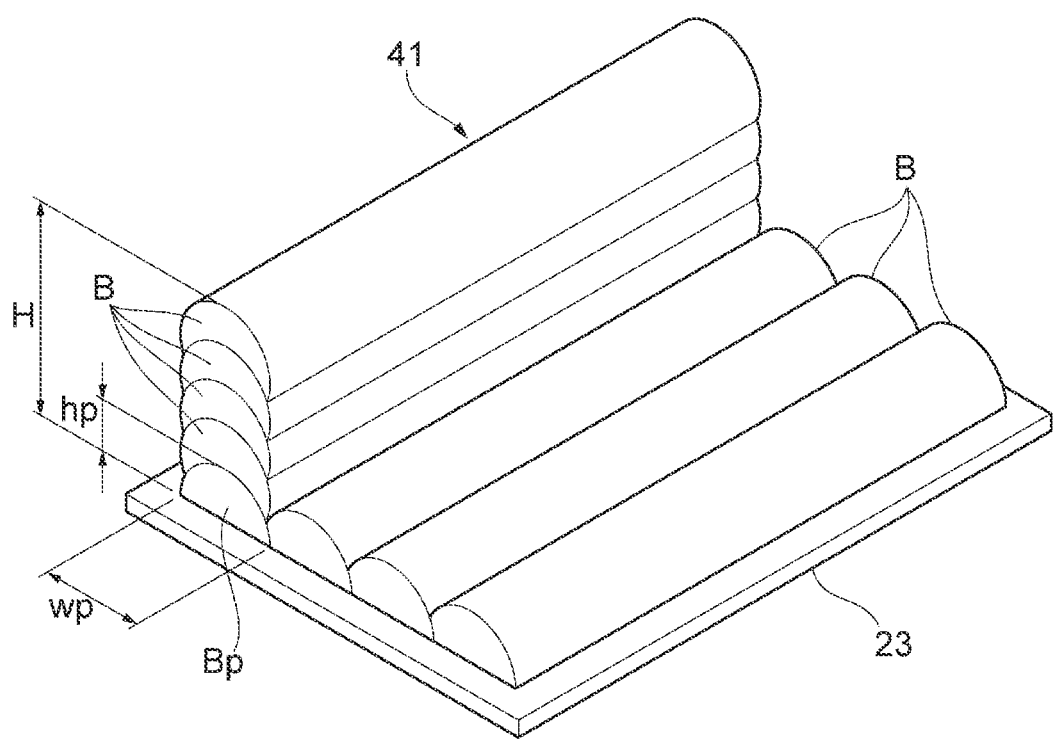
FIG. 2 is a perspective view showing a schematic shape of the additively-manufactured object.

FIG. 2 is a perspective view showing a schematic shape of the additively-manufactured object 25.

The additively-manufactured object 25 shown as an example has a bead deposition portion 41 in which the weld beads B are deposited a plurality of times. In the bead deposition portion 41, a weld bead $B_P$ at the first layer and other weld beads B deposited on the weld bead $B_P$ at the first layer do not always have the same bead height $h_P$ (and bead width $w_P$). Therefore, it is difficult to accurately predict a total height H of the bead deposition portion 41 in which each weld bead is deposited. This is because the heated molten metal drips to a lower layer when the weld bead is formed, and a bead height is reduced by an amount corresponding to a volume of the dripped molten metal.

Therefore, when creating a deposition plan for the additively-manufactured object 25 having the bead deposition portion as described above, the dripping of the weld bead is to be predicted, and a change in the shape of the weld bead due to the dripping is to be reflected to create the deposition plan. A method of creating a deposition plan for an additively-manufactured object in consideration of dripping of a weld bead will be described below.

<Creation of Deposition Plan>

In order to create a deposition plan that sets the bead formation pass and the welding conditions for manufacturing the additively-manufactured object, first, the target shape based on the three-dimensional shape data of the additively-manufactured object is sliced into the plurality of bead models having shapes corresponding to the weld beads.

Figure 3:
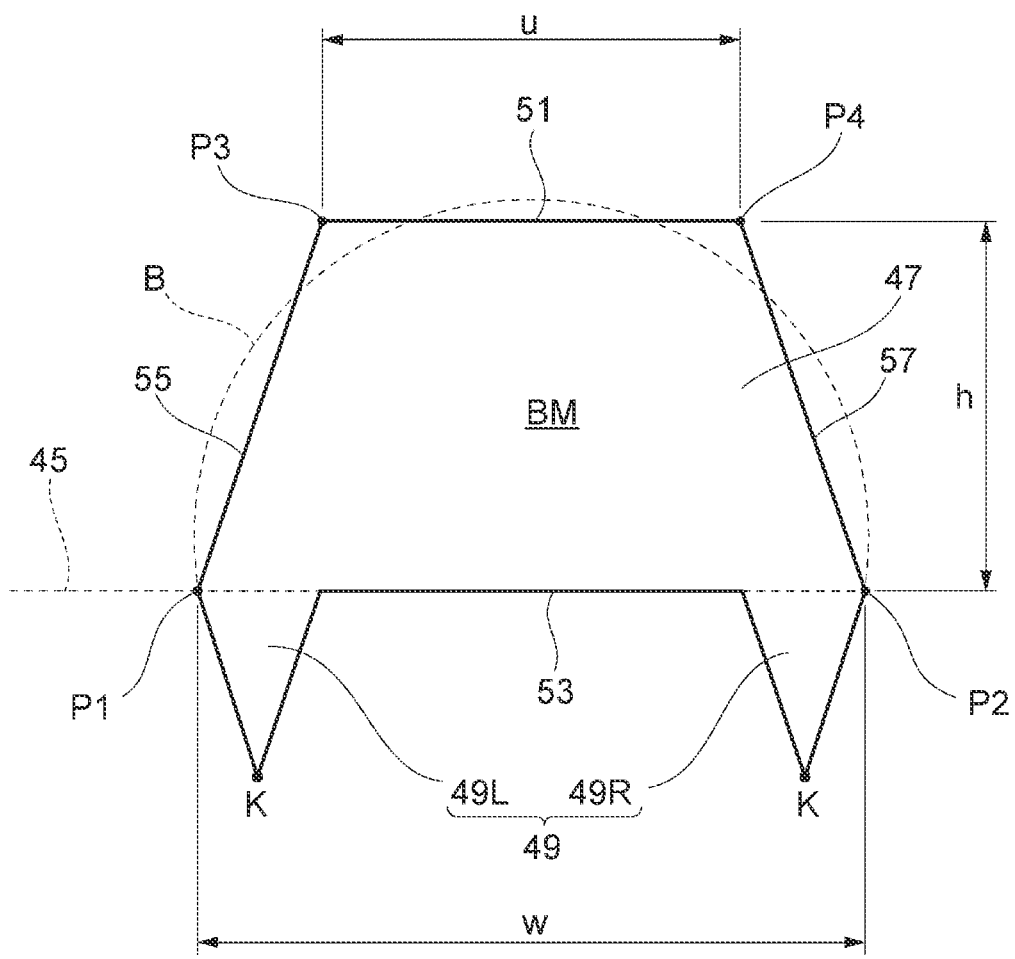
FIG. 3 is a schematic explanatory diagram showing a basic shape of a bead model in a cross section perpendicular to a forming direction of a weld bead.

FIG. 3 is a schematic explanatory diagram showing a basic shape of a bead model BM in a cross section perpendicular to a forming direction of the weld bead B.

In the cross section perpendicular to the forming direction of the bead (a depth direction in FIG. 3), the bead model BM having the basic shape has a remaining portion 47 rising from a bead forming surface 45 (the bead forming surface 45 is the base plate 23 at the lowest layer, and is an upper surface of a lower bead model at an upper layer), and a dripping portion 49 dripping below the bead forming surface 45. The remaining portion 47 has a polygonal shape approximated to a cross-sectional shape of the weld bead B schematically indicated by a dotted line, and is here a trapezoidal region having an upper side 51 and a lower side 53 parallel to each other and a pair of lateral sides 55 and 57. It is assumed that the dripping described above does not occur for the weld bead at the first layer formed on the base plate 23, and the bead model BM is not provided with the dripping portion 49.

A length w of the lower side 53 indicated between the points P1 and P2 of the remaining portion 47 is longer than a length u of the upper side 51 indicated between the points P3 and P4. The dripping portion 49 includes both ends P1 and P2 of the lower side 53 of the remaining portion 47 and includes one or two triangular regions with vertices K formed below the bead forming surface 45. In FIG. 3, two dripping portions 49R and 49L are disposed at both ends of the lower side 53 of the remaining portion 47, but the dripping portions may be disposed at only one of the ends depending on a deposition form. Areas of the triangles of the pair of dripping portions 49L and 49R are equal to each other, but the areas may differ from each other. These cases will be described later.

Figure 4:
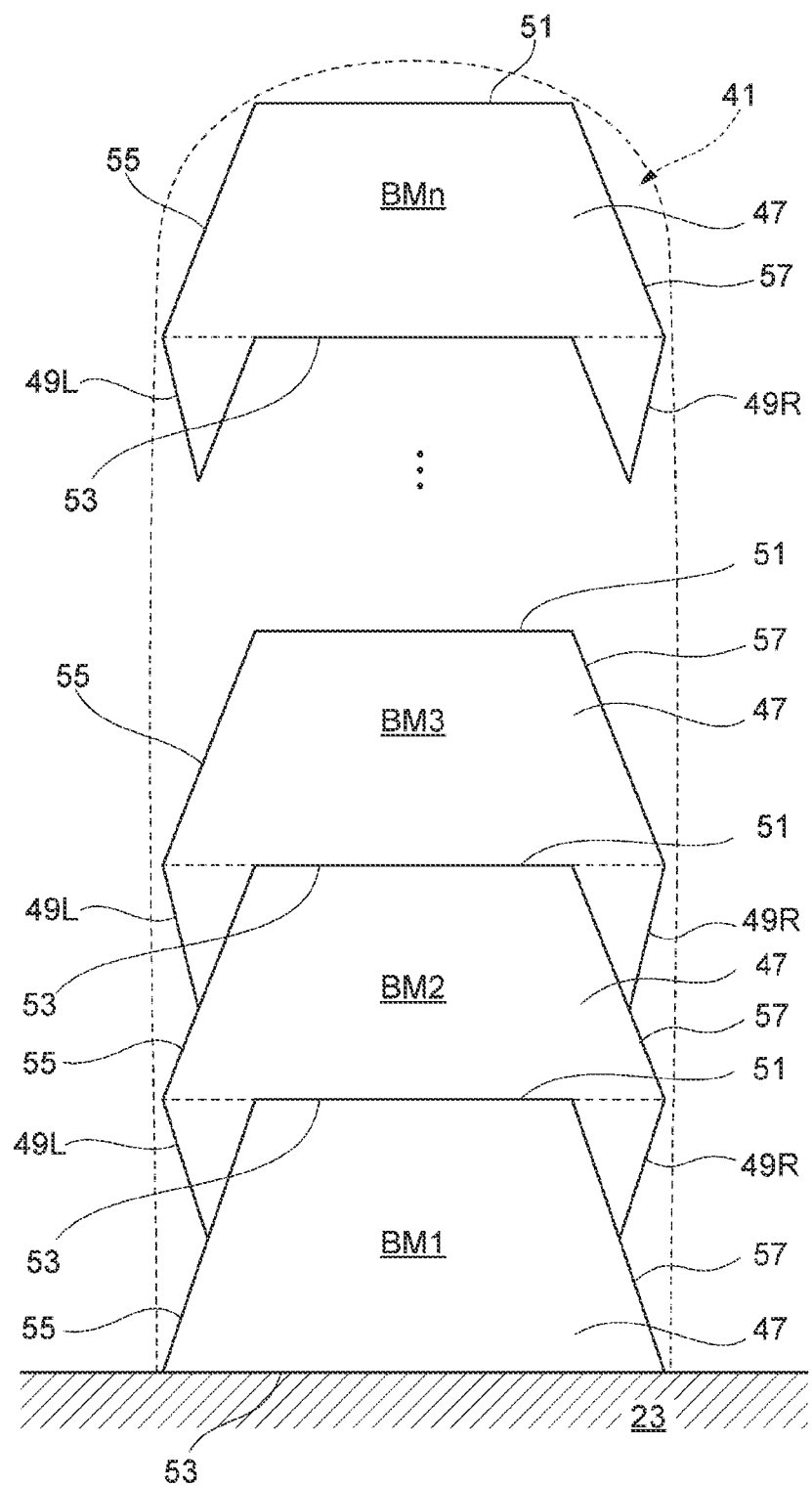
FIG. 4 is a schematic explanatory diagram showing bead models in a bead deposition portion where beads overlap each other.

FIG. 4 is a schematic explanatory diagram showing the bead models in the bead deposition portion 41 where the weld beads overlap each other.

In the bead deposition portion 41, a plurality of layers of weld beads are deposited on the base plate 23. If the plurality of layers of weld beads are modeled on a plane perpendicular to the bead forming direction, bead models $BM_2$, $BM_3$, ..., and $BM_n$ (n represents an integer representing a total number of layers of the weld beads) are sequentially deposited on a bead model $BM_1$ corresponding to the weld bead at the first layer.

The bead model $BM_1$ at the first layer does not have a dripping portion, and the dripping portions 49R and 49L are formed in the bead models $BM_2$, $BM_3$, ..., and $BM_n$ at the second layer or more. Shapes of the dripping portions 49R and 49L are determined according to positions of both ends (P1 and P2 in FIG. 3) of the lower side 53 of the remaining portion 47 of the bead model and positions of both ends (corresponding to P3 and P4 in FIG. 3) of the upper 51 of the remaining portion 47 of the bead model disposed at the lower layer of the bead model, the lateral sides 55 and 57, and the welding conditions for forming the weld beads.

Figure 5:
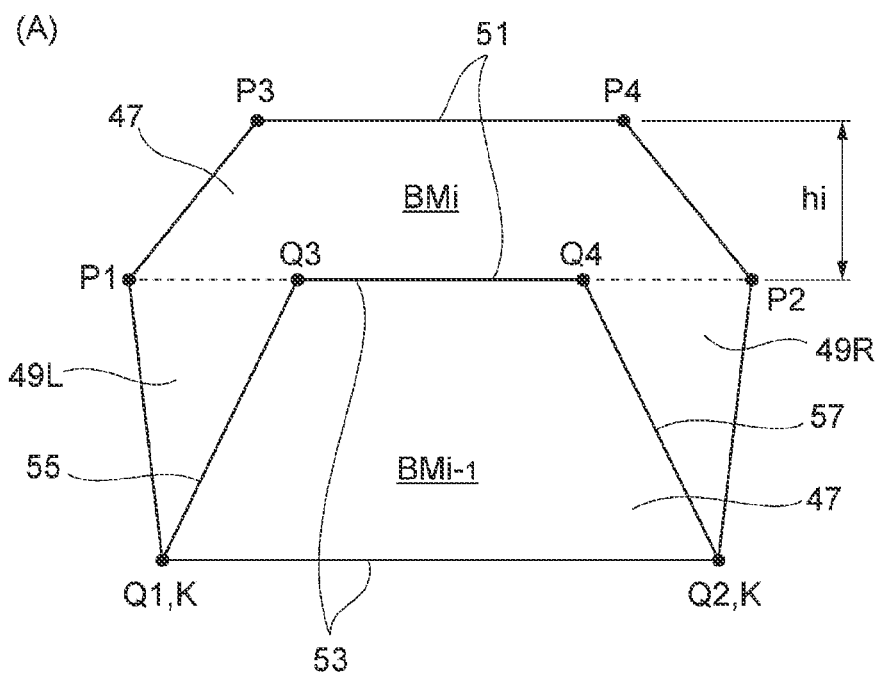
FIGS. 5 (A) and (B) of FIG. 5 are explanatory diagrams showing how the sizes of the dripping portions of the bead model increase or decrease depending on conditions.
Figure 5:
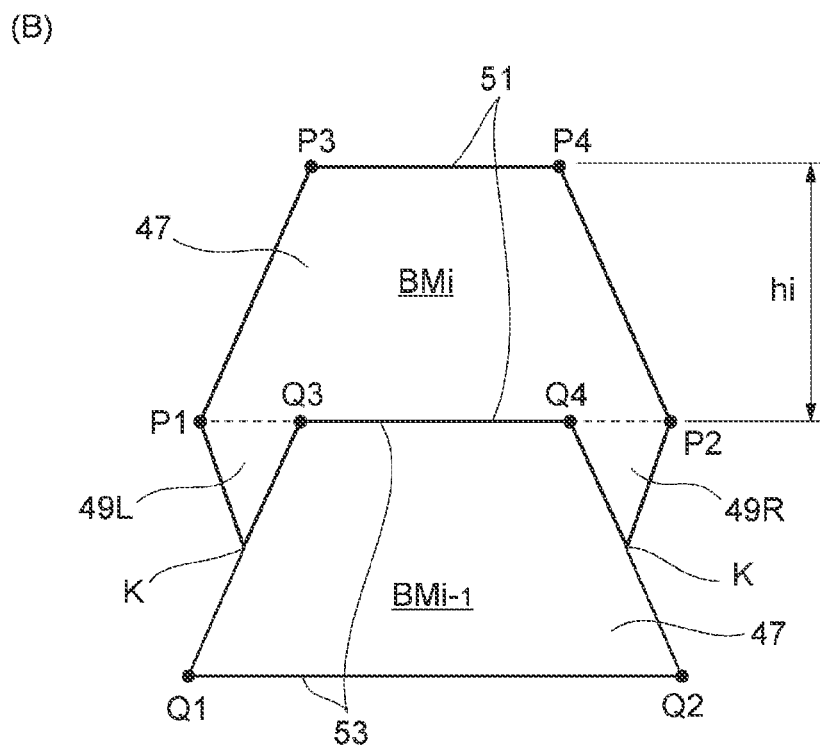

(A) and (B) of FIG. 5 are explanatory diagrams showing how the size of the dripping portion of the bead model increases or decreases depending on the conditions.

When the weld bead is deposited on the weld bead at the lower layer, the weld bead at the upper layer has a dripping portion that drips toward the lower layer. When represented by a model, it is as shown in (A) of FIG. 5. That is, when the bead model $BM_n$ is provided at an upper layer of the bead model $BM_{n-1}$ at the lower layer, the bead model $BM_n$ at the upper layer is provided with the dripping portions 49R and 49L extending downward.

Here, the lower side of the remaining portion 47 of the bead model $BM_{n-1}$ at the lower layer is set between Q1 and Q2, and the upper side thereof is set between Q3 and Q4. The lower side of the remaining portion 47 of the bead model $BM_n$ at the upper layer is set between P1 and P2, and the upper side thereof is set between P3 and P4.

In this case, the dripping portion 49L is formed into a triangular shape with one side between P1 and Q3 and a vertex set along the lateral side 55 (between Q3 and Q1) of the remaining portion 47 of the bead model $BM_{n-1}$ at the lower layer. Similarly, the dripping portion 49R is formed into a triangular shape with a side between P2 and Q4 and a vertex set along the lateral side 57 (between Q4 and Q2) of the remaining portion 47 of the bead model $BM_{n-1}$ at the lower layer.

A maximum possible area of the dripping portion 49L is an area of a triangle with one side between P1 and Q3 and one end Q1 of the lower side 53 as the vertex K. As shown in (B) of FIG. 5, the area of the dripping portion 49L decreases as the vertex K approaches Q3 from Q1. Similarly, the dripping portion 49R also has a maximum possible area when the vertex K is at the position Q2, and the area of the dripping portion 49R decreases as the vertex K approaches Q4 from Q2.

Cross-sectional areas of the bead model $BM_i$ (where i represents an integer representing the number of layers of the weld beads) are set to be the same under the welding conditions in which a feeding amount of the filler metal M is constant. Thus, the cross-sectional area of the bead model $BM_i$ shown in (A) of FIG. 5 is equal to the cross-sectional area of the bead model $BM_i$ shown in (B) of FIG. 5, and thus, a height $h_i$ of the remaining portion 47 of the bead model shown in (B) of FIG. 5 is greater than a height $h_i$ shown in (A) of FIG. 5. The shapes and areas of such dripping portions 49R and 49L change depending on the welding conditions or the like.

In order to quantitatively express the shapes and areas of the dripping portions 49R and 49L, an area ratio of $S_f$ to $S_{fmax}$ is taken as a quantitative value in a case where the maximum areas of the dripping portions 49R and 49L shown in (A) of FIG. 5 are set as $S_{fmax}$ and the areas of the dripping portions 49R and 49L shown in (B) of FIG. 5 are set as $S_f$. That is, a ratio of the cross-sectional area of the actually dripping region to the largest triangular region expected to drip to the lower layer is defined as a percentage of filling $\alpha[\%]$ $(=S_f/S_{fmax}\times 100)$.

It is known that the percentage of filling $\alpha$ varies depending on the welding conditions. An example of obtaining the percentage of filling $\alpha$ for each of cases where the welding conditions are changed will be described below.

Figure 6:
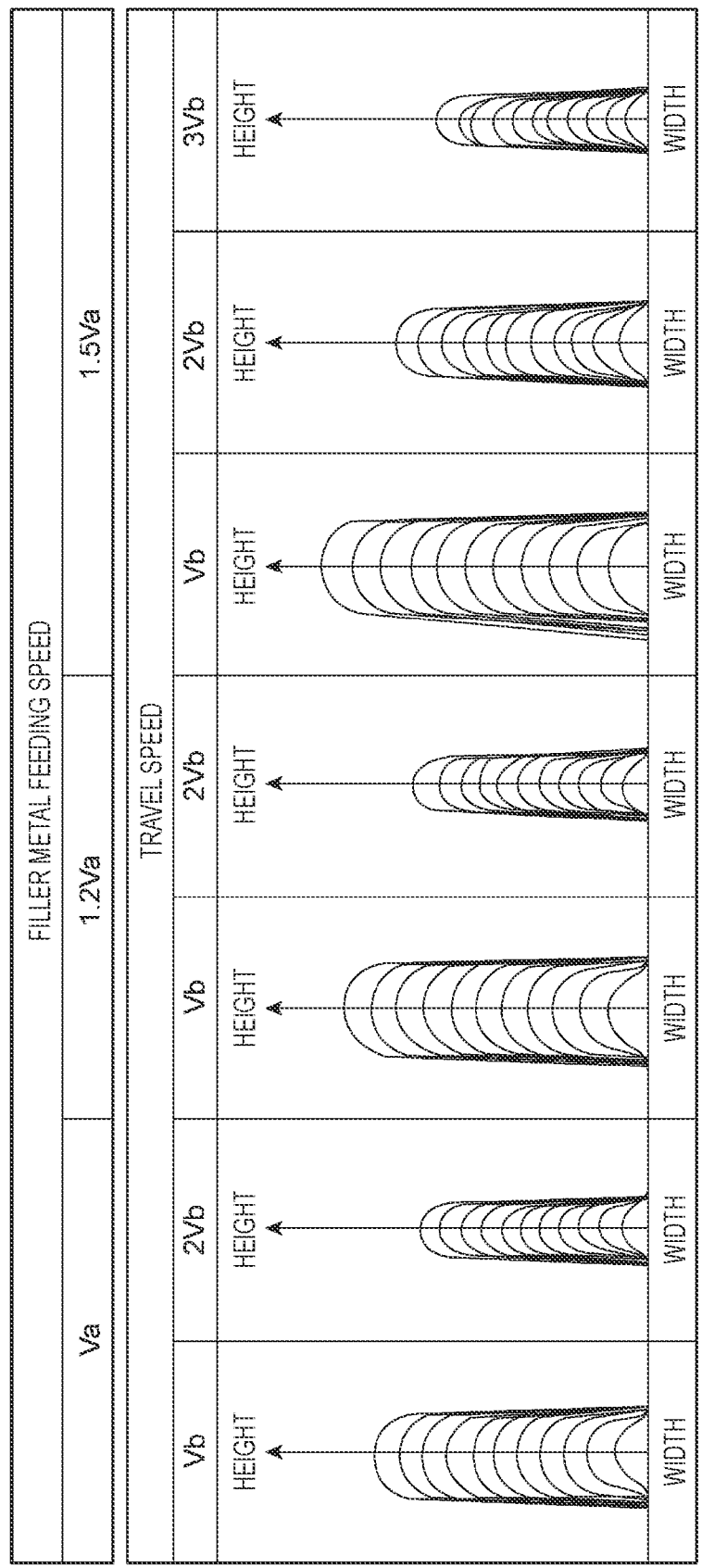
FIG. 6 is an explanatory diagram showing a predicted profile of each weld bead when the weld beads are deposited while changing a filler metal feeding speed and a travel speed respectively.

FIG. 6 is an explanatory diagram showing a predicted profile of each weld bead when the weld beads are deposited while a filler metal feeding speed and a travel speed are changed.

The shape of each weld bead is predicted by simulation when a total of 11 layers are deposited under conditions of filler metal feeding speeds of Va, 1.2Va, and 1.5Va and, travel speeds of Vb, 2Vb, and 3Vb (only when the filler metal feeding speed is 1.5Va).

As shown in FIG. 6, when the filler metal feeding speed is Va, as the travel speed is increased from Vb to 2Vb, the bead width of the weld bead becomes narrower and the deposition height becomes lower. The same applies when the filler metal feeding speed is 1.2Va and 1.5Va.

Figure 7:
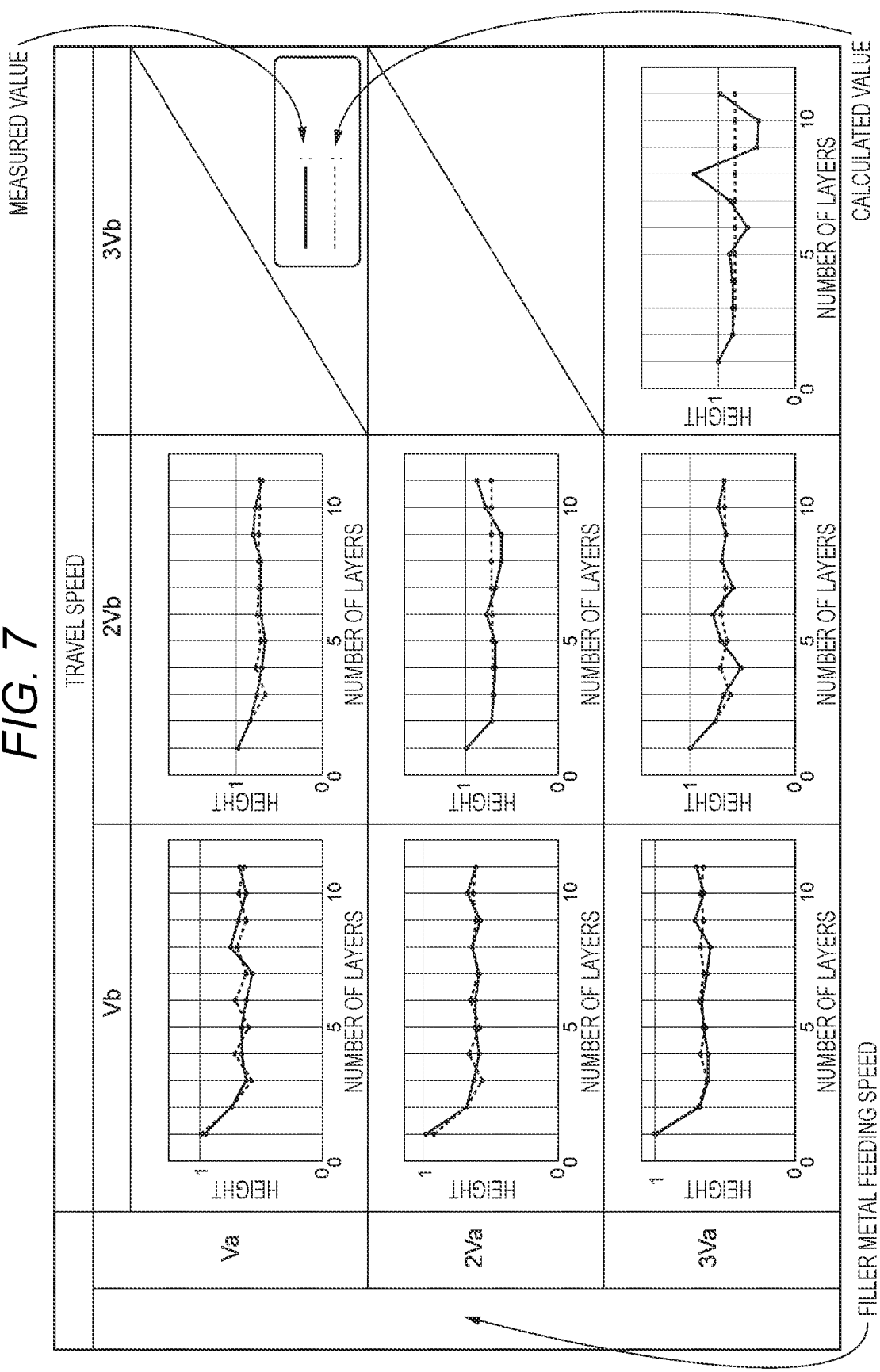
FIG. 7 is an explanatory diagram showing changes in a bead height for each number of layers of the weld bead under each welding condition shown in FIG. 6.

FIG. 7 is an explanatory diagram showing changes in the bead height for each number of layers of the weld bead under each welding condition shown in FIG. 6.

The bead height shown in FIG. 7 is indicated by a ratio of bead heights of second and subsequent layers to a bead height of a first layer, with the bead height of the first layer as a reference value (=1).

The bead height of the weld bead for each layer tends to be higher in a range of, for example, three layers or less, and is substantially constant in a range of four layers or more, although the bead height depends on the conditions. The tendency becomes more remarkable as the travel speed becomes slower. On the other hand, almost no difference is observed in the bead height due to the difference in the filler metal feeding speed. Also, the faster the filler metal feeding speed gets, the less stable the shape of the weld bead becomes. Thus, it is shown that the travel speed particularly among various welding conditions has a correlation with the bead height of the weld bead.

Figure 8:
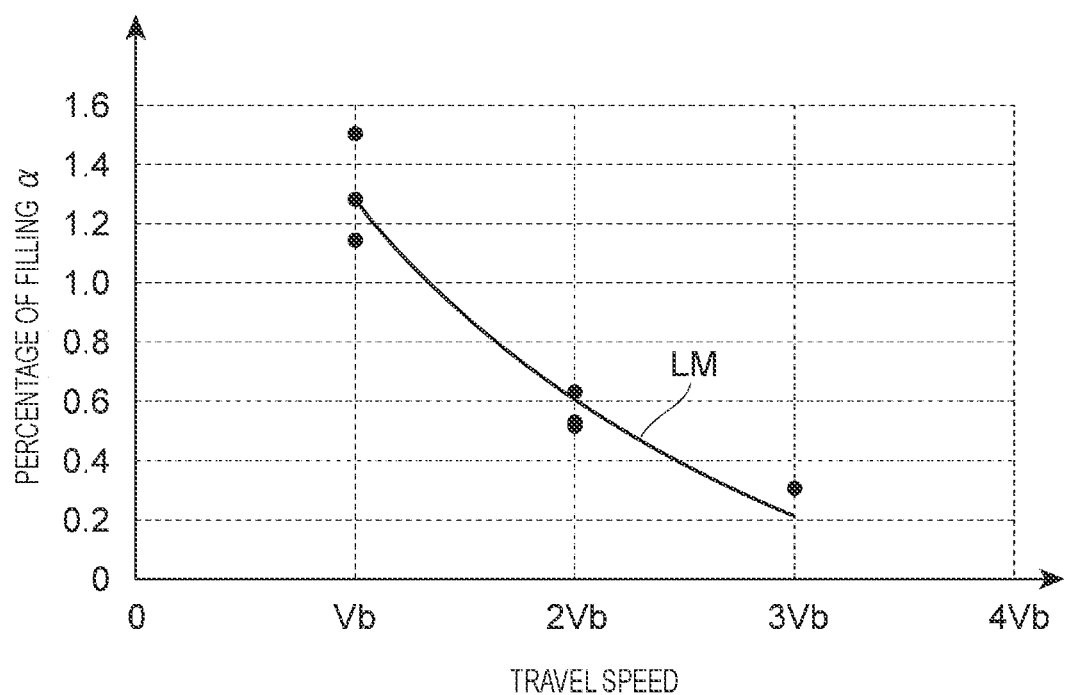
FIG. 8 is a graph showing how a percentage of filling changes with respect to the travel speed.

FIG. 8 is a graph showing how the percentage of filling changes with respect to the travel speed.

FIG. 8 shows a result that is obtained by approximating the shapes of the weld beads at the third and subsequent layers under each welding condition shown in FIGS. 6 and 7 to the bead model shown in FIG. 3, and by calculating the percentage of filling α of the dripping portion of the approximated bead model. This graph shows an approximation curve LM obtained by a least square method for the filling rate α obtained under each welding condition. According to FIG. 8, the faster the travel speed gets, the smaller the dripping amount of the weld bead gets and the smaller the percentage of filling α becomes. The slower the travel speed gets, the larger the dripping amount of the weld bead gets and the larger the percentage of filling α becomes.

By registering the change characteristics of the percentage of filling with respect to the travel speed as shown in FIG. 8 in the database in advance, once the travel speed at which the weld bead is formed is determined, the percentage of filling α corresponding to the travel speed is easily obtained by referring to the registered database.

Next, a formula for calculating the shape of the bead model will be described.

Figure 9:
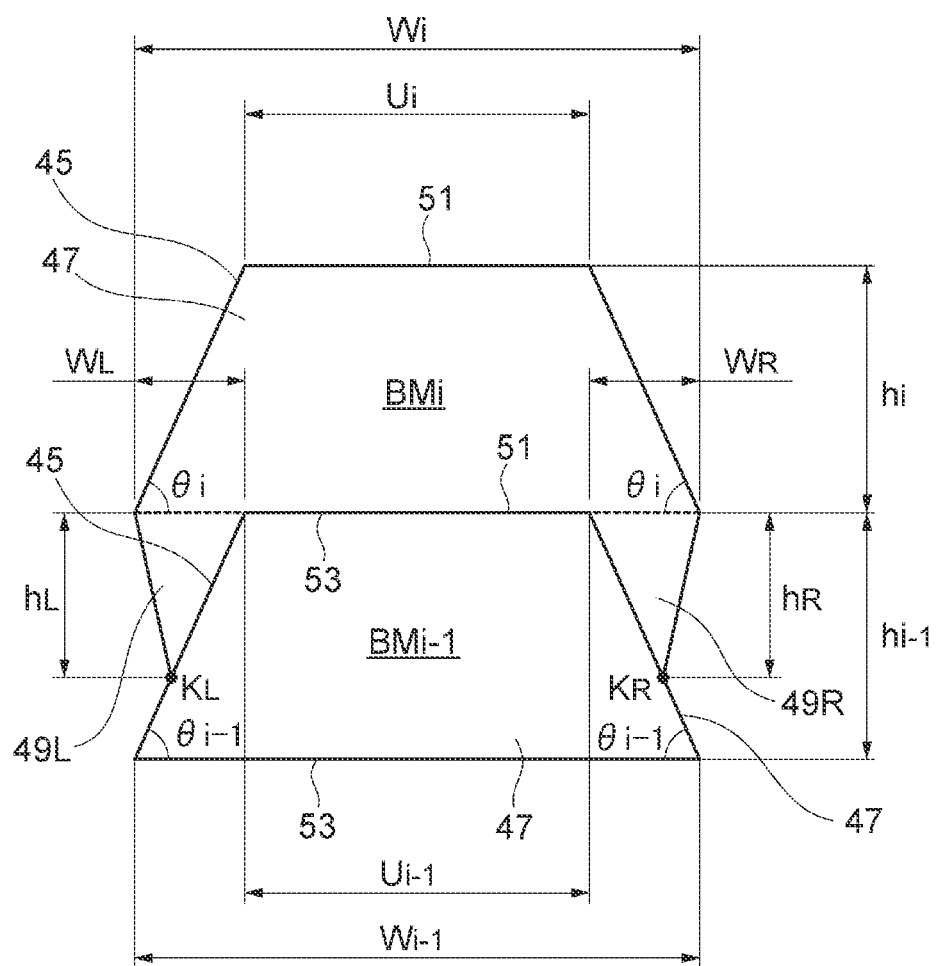
FIG. 9 is an explanatory diagram showing shapes of a bead model at an upper layer and a bead model at a lower layer in a cross section perpendicular to the forming direction of the weld bead.

FIG. 9 is an explanatory diagram showing the shapes of the bead model $BM_i$ at the upper layer and the bead model $BM_{i-1}$ at the lower layer in the cross section perpendicular to the forming direction of the weld bead. The meanings of the symbols shown in FIG. 9 are as follows.

S: a total cross-sectional area of the bead model $BM_i$ at the upper layer (including the remaining portion 47 and the dripping portions 49R and 49L)

$S_e$: the area of the remaining portion 47 of the bead model $BM_i$ $S_f$: a total area of the dripping portions 49R and 49L of the bead model $BM_i$ $u_i$: the length of the upper side 51 of the remaining portion 47 of the bead model $BM_i$ $w_i$: the length of the lower side 53 of the remaining portion 47 of the bead model $BM_i$ $h_i$: the height of the remaining portion 47 of the bead model $BM_i$ $\theta_i$: base angles of the remaining portion 47 of the bead model $BM_i$ (angles formed by the lower side 53 and the lateral sides 55 and 57)

$\theta_{i-1}$: base angles of the remaining portion 47 of the bead model $BM_{i-1}$ (angles formed by lower side 53 and the lateral sides 55 and 57)

$h_R$: the height of the dripping portion 49R of the bead model $BM_i$ $h_L$: the height of the dripping portion 49L of the bead model $BM_i$ $w_R$: the width of the dripping portion 49R of the bead model $BM_i$ $h_L$: the width of the dripping portion 49L of the bead model $BM_i$ In this case, the percentage of filling $\alpha_R$ [%] of the dripping portion 49R and the percentage of filling $\alpha_L$, [%] of the dripping portion 49L can be expressed by Formulas (1) and (2), respectively.

$$\alpha_R = \frac{w_R h_R}{w_R h_{i-1}} \times 100 \qquad (1)$$

$$\alpha_L = \frac{w_L h_L}{w_L h_{i-1}} \times 100 \qquad (2)$$

Here, the percentages of filling $\alpha_R$ and $\alpha_L$, are assumed to be equal and are collectively expressed as $\alpha(\alpha=\alpha_R=\alpha_L)$.

The area $S_e$ of the remaining portion can be expressed by Formula (3) based on the area S of the entire bead model $BM_n$ and the area $S_f$ of the dripping portion 49.

$$S_e = S - S_f = S - \frac{(w_i - u_{i-1})h_{i-1}\alpha}{2} = \frac{(w_i + u_i)h_i}{2} \qquad (3)$$

The base angle $\theta_i$ and $w_i$, $u_i$, and $h_i$ of the remaining portion 47 have a relationship of Formula (4).

$$\tan\theta_i = \frac{2h_i}{w_i - u_i} \qquad (4)$$

From the above Formulas (3) and (4), the length $u_i$ of the upper side 51 and the height $h_i$ of the remaining portion 47 at the n-th layer can be expressed by Formulas (5) and (6).

$$u_i = \sqrt{\frac{\tan\theta_i w_i^2 - 4S + 2(w_i - u_{i-1})h_{i-1}\alpha_i}{\tan\theta_i}} \qquad (5)$$

$$h_i = \frac{2S_e}{(w_i + u_i)} \qquad (6)$$

Based on the above, after determining the welding conditions for forming the weld bead in the deposition plan, the percentage of filling α corresponding to the welding conditions is obtained by referring to the database described above, and the obtained percentage of filling α is set as $\alpha_i$ according to the number of layers i of the weld bead. Values of φ, $w_R$, $w_L$, $h_R$, and $h_L$ calculated based on S, $w_i$, $\tan\theta_{i-1}$, $h_{i-1}$, and $S_f$, which are known parameters obtained from the deposition plan, are obtained, and the parameters and the set percentage of filling $\alpha_i$ are substituted into Formulas (5) and (6) to obtain the length $u_i$ and the height $h_i$ of the upper side 51 of the remaining portion 47 of the bead model $BM_i$.

Accordingly, the shape of the bead model $BM_i$ may be determined with more accurate height and width corresponding to the dripping portions 49R and 49L.

Figure 10:
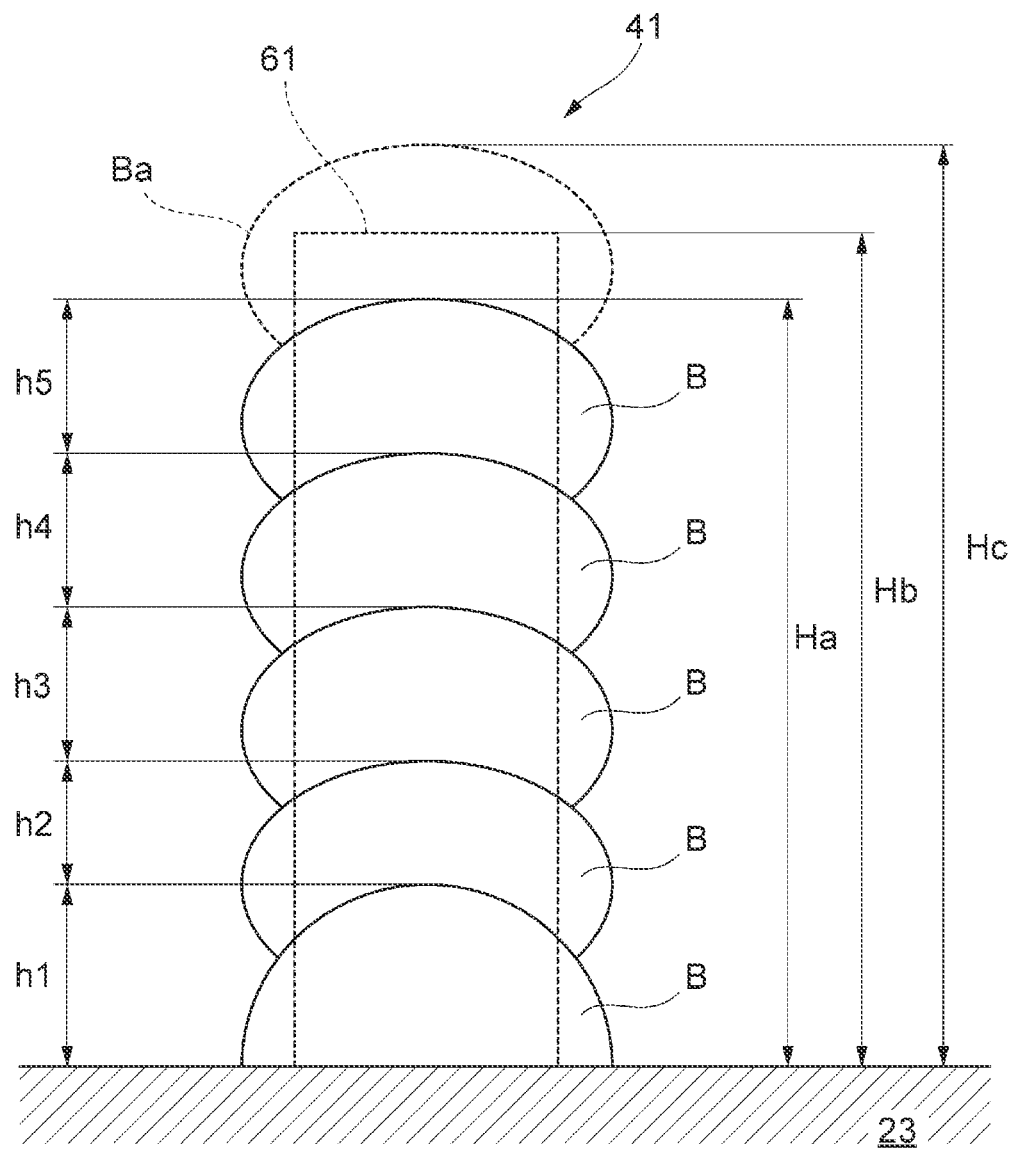
FIG. 10 is a schematic explanatory diagram of weld beads when a bead model is applied to the bead deposition portion.

FIG. 10 is a schematic explanatory diagram of the weld bead B when the bead model is applied to the bead deposition portion 41.

Here, in order to obtain a target shape 61 of the additively-manufactured object, a case is exemplified in which the plurality of weld beads B are deposited on the base plate 23 to form the bead deposition portion 41.

For example, it is assumed that a deposition plan for obtaining the target shape 61 is created without considering the effects of dripping, and a deposition height equal to or greater than a height Hb of the target shape is calculated if five layers of the weld beads B are deposited. In this case, the above-described dripping portion 49 is formed on an actual weld bead B, so that the bead heights h1 to h5 of the respective layers change by volumes of the generated dripping. Thus, the deposition height Ha, which is the sum of the heights of the weld beads B of the five layers, becomes lower than the height Hb of the target shape. In this case, the bead deposition portion 41 cannot be formed into a perfect shape.

In such a case, a weld bead Ba is added until the deposition height Hc is greater than the height Hb of the target shape. That is, a new bead model is added to the bead model at the top layer. Accordingly, the deposition plan that can reliably obtain the height Hb of the target shape even when the dripping occurs may be obtained.

The procedure for creating the deposition plan described above may be summarized as follows.

Figure 11:
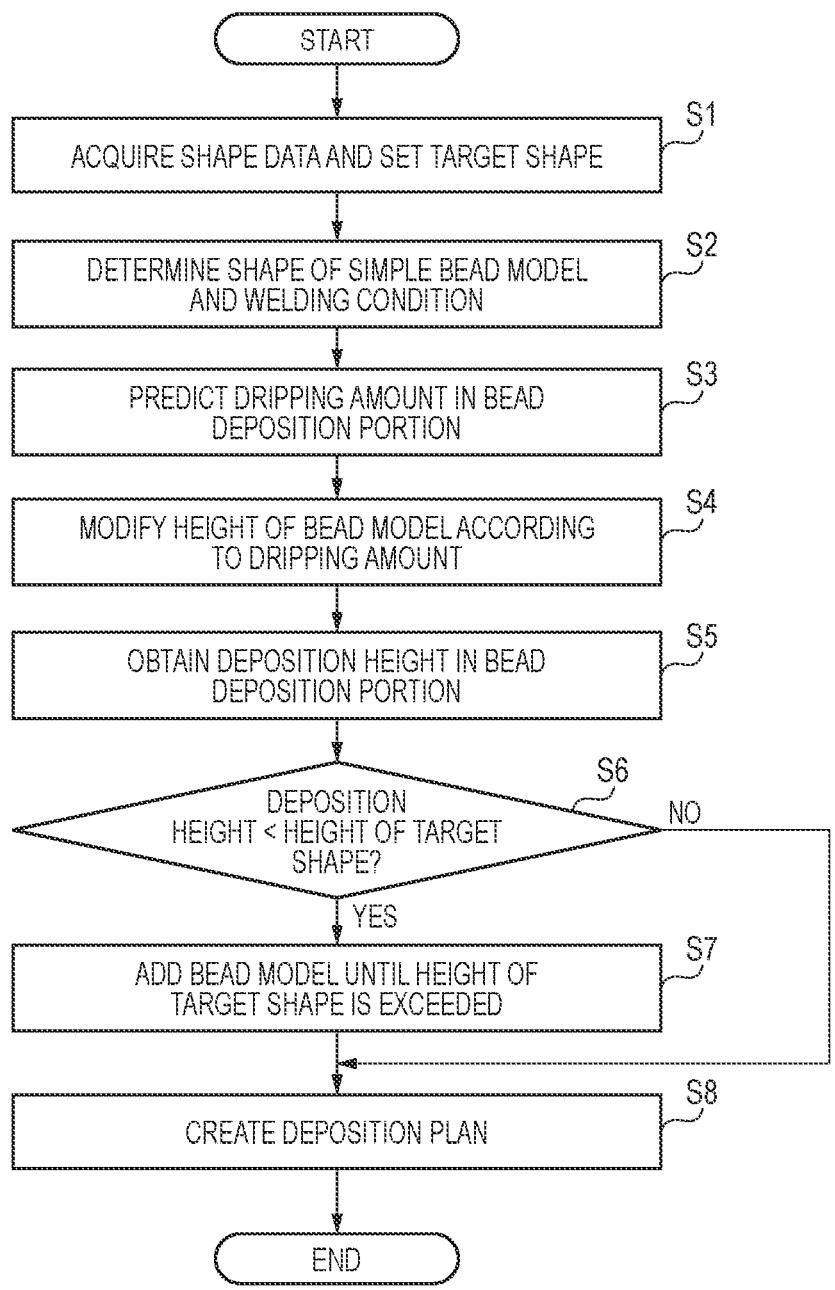
FIG. 11 is a flowchart showing a creation procedure of a deposition plan.

FIG. 11 is a flowchart showing a creation procedure of the deposition plan.

First, the three-dimensional shape data of the additively-manufactured object is obtained, and the target shape is set (S1).

Assuming that the set target shape is additively manufactured on the base plate, the target shape is sliced into simple bead models having trapezoidal shapes or the like, and various dimensions and welding conditions of the simple bead models are determined (S2).

An amount of the filler metal dripping to the lower layer during the bead formation in the bead deposition portion 41 in which the simple bead models among the plurality of simple bead models overlap vertically is predicted according to the welding conditions of the weld bead (S3). Here, according to the arrangement of the determined simple bead model and the welding conditions, the dripping to the preceding layer is obtained using the above-described Formulas, and the shape of the simple bead model is replaced with a shape of the bead model BM as shown in FIG. 3 which has the remaining portion 47 and the dripping portion 49 (may not be present in some models).

A welding amount of the weld bead B is constant regardless of the welding conditions, which is a constraint, and the area of each bead model BM is constant. The area $S_f$ of the dripping portion 49 is determined by using the percentage of filling α. The percentage of filling α is obtained by referring to a database of the percentage of filling α experimentally obtained in advance according to the welding conditions. The database of the filling rate α may be an approximate curve formula representing a relationship of the percentage of filling α corresponding to the travel speed as shown in FIG. 8 described above, or may be a correspondence table of the travel speed and the percentage of filling α.

The bead height of each bead model in the bead deposition portion 41 is modified according to the predicted dripping amount (S4).

Next, the deposition height Ha is obtained by totaling each of the bead heights of the bead models BM in the bead deposition portion 41 (S5). Then, it is determined whether the obtained deposition height Ha is greater than the height Hb of the target shape (S6). As shown in FIG. 10, if the deposition height Ha is lower than the height Hb of the target shape, at least one bead model BMa is added until the height of the target shape is exceeded (S7).

Then, when the deposition height Hc of the bead model BM exceeds the height Hb of the target shape, the deposition plan is created using all the bead models BM including the newly added bead model (S8). The created deposition plan is stored in the storage unit 35 as a drive program for driving each unit of the additive manufacturing device 11 shown in FIG. 1.

According to the deposition plan created in this way, even in a case where the deposition height changes due to the dripping occurring during the bead formation in the bead deposition portion 41 where the weld beads are to be deposited in a plurality of layers, the bead model is set in consideration of the dripping, so that the bead model can be reliably manufactured to a deposition height greater than the height of the target shape. Therefore, highly accurate additive manufacturing may be performed without being affected by the dripping.

<Other Arrangement of Bead Models>

Next, the arrangement of bead models for various forms of the weld beads will be described.

Figure 12:
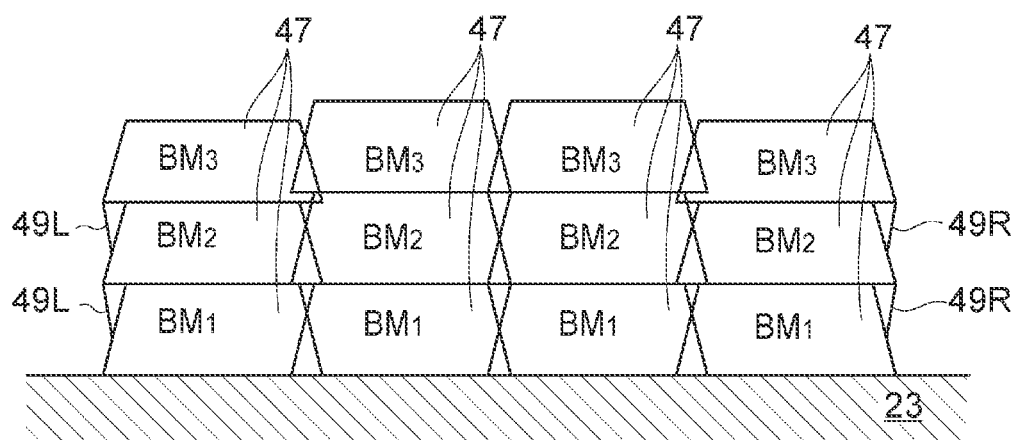
FIG. 12 is a schematic diagram of the bead models, which shows an aspect in which the plurality of bead models are arranged in a plurality of rows to form a block.

FIG. 12 is a schematic diagram of the bead models, which shows an aspect in which the plurality of bead models $BM_1$, $BM_2$, and $BM_3$ are arranged in a plurality of rows to form a block.

The bead models $BM_1$, $BM_2$, and $BM_3$ are arranged with overlapping portions between adjacent bead models respectively. The bead models $BM_1$, $BM_2$, and $BM_3$ in the rows at both ends of the plurality of rows are provided with the dripping portions 49R and 49L. In this case, the bead models $BM_1$, $BM_2$, and $BM_3$ in the rows inside the rows at both ends have the overlapping portions overlapping each other, so that the bead height hardly changes even when the dripping occurs. However, the bead models $BM_1$, $BM_2$, and $BM_3$ in the rows at both ends are affected by the dripping.

Therefore, only the bead models $BM_1$, $BM_2$, and $BM_3$ in the rows at both ends where the height change due to the dripping is particularly large are provided with the dripping portions 49R and 49L, and the height of the remaining portion 47 is to be modified according to the sizes of the dripping portions 49R and 49L. Accordingly, it is only necessary to perform partial height modification, and an accurate deposition plan may be created efficiently.

Figure 13:
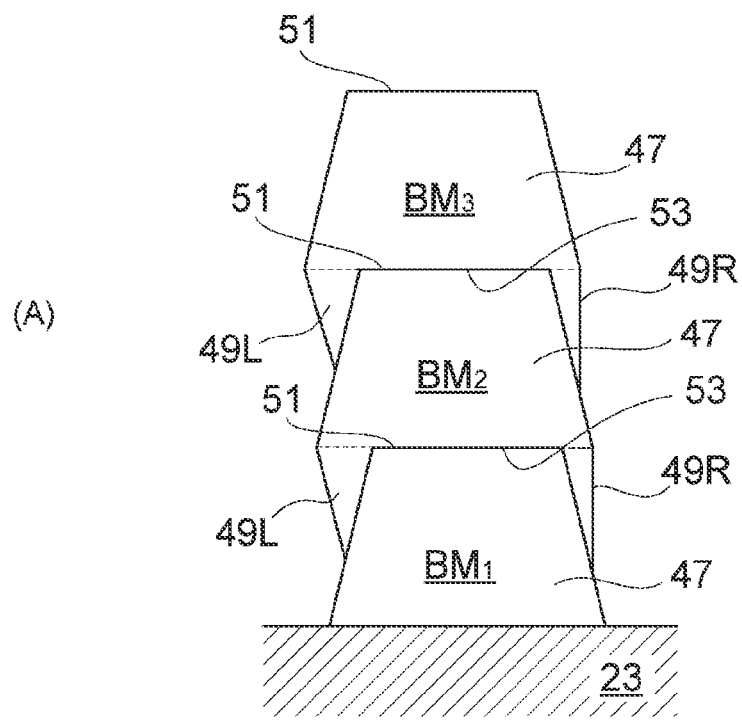
FIGS. 13 (A) and (B) of FIG. 13 are schematic diagrams of the bead models, each showing an aspect in which a shape of an additively-manufactured object having overhangs is sliced into a plurality of bead models.
Figure 13:
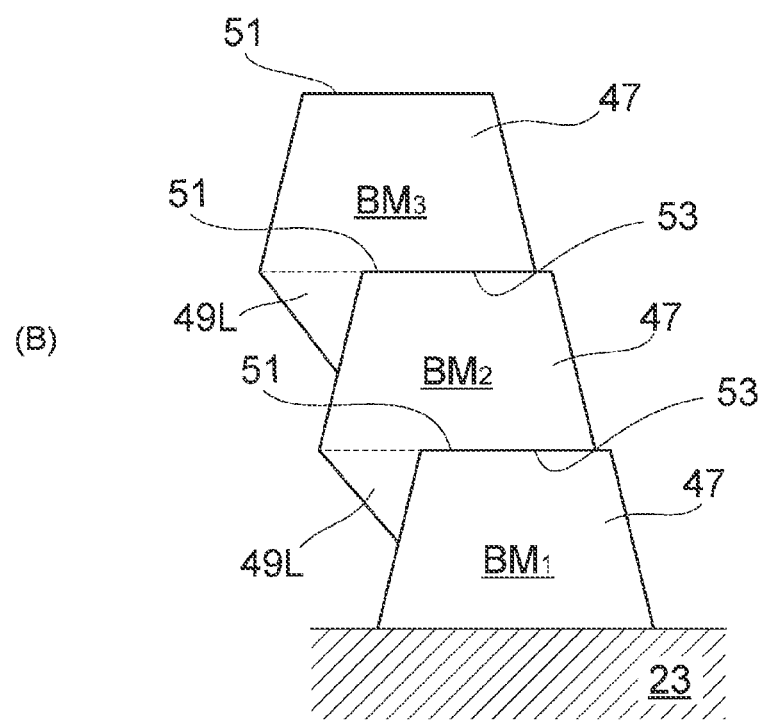

(A) and (B) of FIG. 13 are schematic diagrams of the bead models, each showing an aspect in which a shape of an additively-manufactured object having overhangs is sliced into the plurality of bead models BM.

(A) of FIG. 13 shows a case where the bead models $BM_1$, $BM_2$, and $BM_3$ to be deposited are obliquely deposited, and the upper side 51 of the bead model at the lower layer is arranged inside the both ends of the lower side 53 of the bead model to be deposited at the upper layer. In this case, each of the bead models $BM_2$ and $BM_3$ is provided with the dripping portions 49R and 49L at the both ends of the lower side 53, and the height of the remaining portion 47 is to be obtained.

On the other hand, as shown in (B) of FIG. 13, when one end of the lower side 53 of the bead model to be deposited on the upper layer is disposed at the inner sides of the both ends of the upper side 51 of the bead model at the lower layer, the dripping portion (here, 49L) is provided only on the other end side of the lower side 53 of the bead model disposed at the upper layer, and the height of the remaining portion 47 is obtained.

In this case, Formula (7) is obtained from a relationship between Formulas (1), (4), and (6).

$$\tan\theta_i = \frac{4S - 4S_f}{w_i^2 - u_i^2} \quad (7)$$

The total area $S_f$ of the dripping portions 49R and 49L can be expressed by Formulas (8) and (9). Here, $S_{fp}$ represents an area of an overlapping portion 63 with the surrounding bead model, and $S_c$ represents an area of a gap 65 generated between adjacent bead models (see FIG. 15 described later).

$$S_f = S_{fa} - S_{fp} \quad (8)$$

$$S_{fa} = 0.5 W_R h_R + 0.5 W_L h_L + S_c \quad (9)$$

Figure 14:
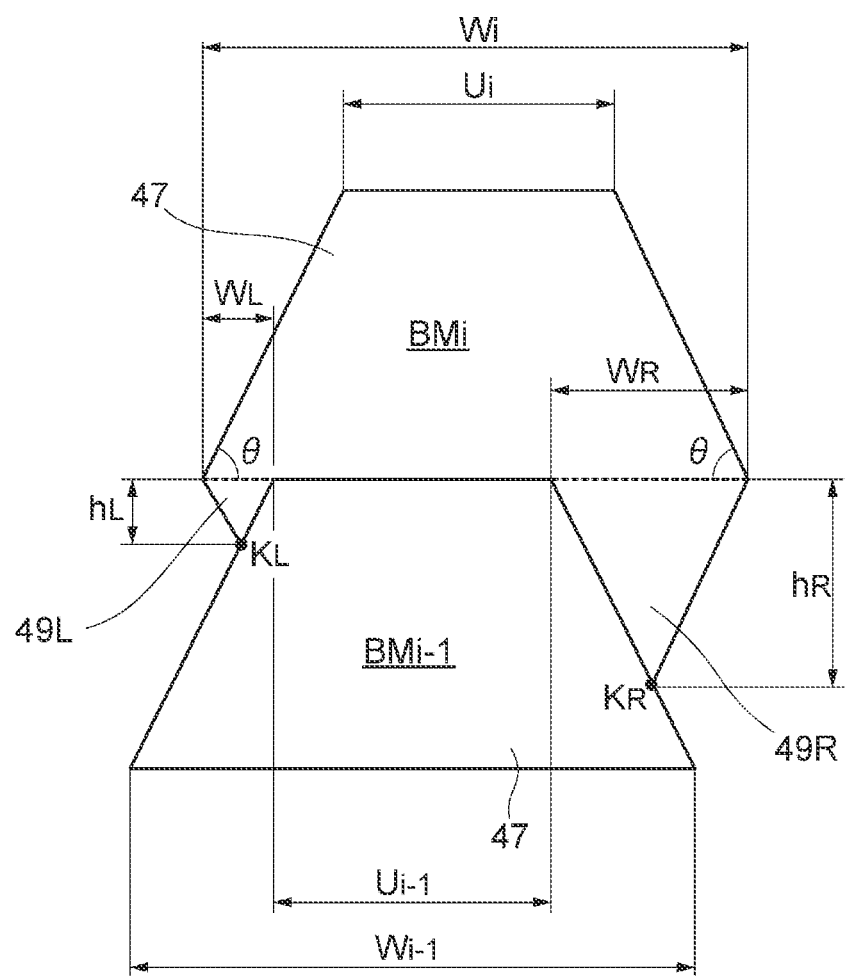
FIG. 14 is an explanatory diagram showing the bead models of the additively-manufactured object when the additively-manufactured object has overhangs.
Figure 15:
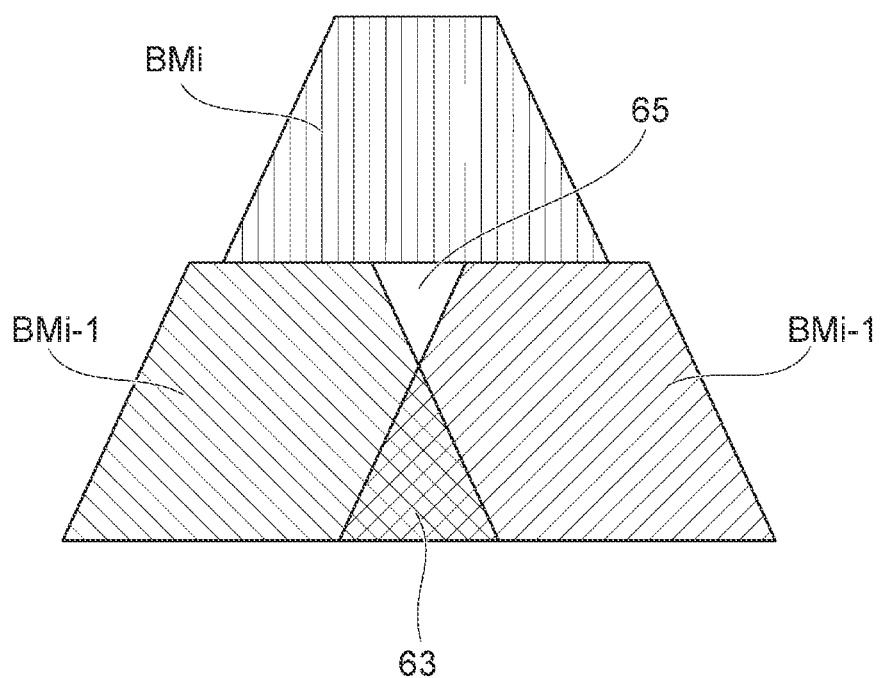
FIG. 15 is an explanatory diagram of the bead models, which shows an overlapping portion and a gap between the bead models.

FIG. 14 is an explanatory diagram showing the bead models when the additively-manufactured object has overhangs. FIG. 15 is an explanatory diagram of the bead models, which shows the overlapping portion and the gap.

Based on Formulas (7), (8), and (9), similarly to the above, the length $u_i$ and the height $h_i$ of the upper side 51 of the remaining portion 47 of the bead model $BM_i$ are obtained from Formulas (5) and (6). Accordingly, even in a case where the dripping portions 49R and 49L are asymmetrical to each other or only one of the dripping portions 49R and 49L exists, an accurate bead model shape can be obtained.

The present invention is not limited to the above-described embodiments, and the present invention intends to combine the configurations of the embodiments with each other, and is also intended to be changed and applied by those skilled in the art based on the description of the specification and a well-known technique, which are included in the scope required to be protected.

As described above, the specification discloses the following matters.

(1) A deposition plan creation method for creating a deposition plan in which a bead formation pass and welding conditions for weld beads obtained by melting and solidifying a filler metal when an additively-manufactured object is manufactured by depositing the weld beads are set, the deposition plan creation method including:

setting a target shape from three-dimensional shape data of the additively-manufactured object;

slicing the set target shape into a plurality of bead models having shapes corresponding to the weld beads;

predicting, according to the welding condition of the weld beads, an amount of the filler metal that drips to a lower layer during bead formation in a bead deposition portion in which the bead models vertically overlap one another among the plurality of bead models;

modifying a bead height of each of the bead models in the bead deposition portion according to the predicted dripping amount; and creating the deposition plan for manufacturing the additively-manufactured object using the plurality of bead models including the bead model with the modified bead height.

According to the deposition plan creation method, the bead model with an accurate bead height may be set by predicting the amount of filler metal that drips to the lower layer according to the welding condition of the weld beads when the beads are formed in the bead deposition portion. Accordingly, the deposition plan that provides an accurate deposition height without being effected by dripping may be created.

(2) The deposition plan creation method according to (1), in which during modifying of the bead height the dripping amount is modified according to a travel speed for forming the weld beads.

According to the deposition plan creation method, the bead height of the bead model may be accurately set by modifying the dripping amount according to the travel speed that correlates with the dripping amount.

(3) The deposition plan creation method according to (2), further including:

preparing a database containing information representing a relationship between the travel speed during the bead formation and the dripping amount of the filler metal during the bead formation, in which during the modifying of the bead height the database is referred to, the dripping amount corresponding to the travel speed during the bead formation is obtained, and the bead height of the bead model is modified to a height in accordance with the dripping amount.

According to the deposition plan creation method, the bead height may be modified efficiently by obtaining the dripping amount with reference to the database prepared in advance.

(4) The deposition plan creation method according to (3), in which in a cross section perpendicular to a bead forming direction, each of the bead models deposited in a plurality of layers has a remaining portion representing a region to be built up from a bead forming surface, and a dripping portion representing a dripping region provided only when the dripping region drips downward from the bead forming surface, the remaining portion is a trapezoidal region having an upper side and a lower side parallel to each other and a pair of lateral sides, and having the longer lower side than the upper side, the dripping portion is disposed below the lower side of the remaining portion of the bead model at an i-th layer, and includes one or two triangular regions formed along one lateral side or both lateral sides of the remaining portion of the bead model at an (i−1)-th layer disposed below the bead model at the i-th layer, and a shape of the bead model is determined by using a following formula, where with respect to the bead model at the i-th layer, a total area of the bead model is set as S, an area of the remaining portion is set as $S_e$, a total area of the dripping portion is set as $S_f$, a length of the upper side of the remaining portion is set as $u_i$, a length of the lower side is set as $w_i$, a height is set as $h_i$ and a base angle is set as $\theta_i$, with respect to the bead model at the (i−1)-th layer, a length of the upper side of the remaining portion is set as $u_{i-1}$, a length of the lower side is set as $w_{i-1}$, and a height is set as $h_{i-1}$, and α represents a ratio of the area of the dripping portion to a maximum possible total area of the dripping portion.

$$S_e = S - S_f = S - \frac{(w_i - u_{i-1})h_{i-1}\alpha}{2} = \frac{(w_i + u_i)h_i}{2}$$

-continued $$\tan\theta_i = \frac{2h_i}{w_i - u_i}$$

According to the deposition plan creation method, the bead model having the trapezoidal remaining portion and the triangular dripping portion may be used to accurately predict the bead height by geometric calculation.

(5) The deposition plan creation method according to (4), in which
in a case where the bead deposition portion in which the bead models are deposited with an overhang, a shape of the bead model at the i-th layer is determined by using the following formula, where
in a cross section perpendicular to the bead forming direction of the weld beads,
in a case where the dripping portion is formed at one end of the lower side of the remaining portion, a length of a bottom side of a triangular dripping portion is set as $W_R$, and a height from the bottom side to a vertex is set as $h_R$,
in a case where the dripping portion is formed at the other end of the lower side of the remaining portion, a length of a bottom side of a triangular dripping portion is set as $W_L$, and a height from the bottom side to a vertex is set as $h_L$,
an area of an overlapping portion between the bead model and another surrounding bead model is set as $S_{fp}$, and
a gap area formed between the remaining portion and an adjacent remaining portion is set as $S_c$.

$$\tan\theta_i = \frac{4S - 4S_f}{w_i^2 - u_i^2}$$

$$S_f = S_{fa} - S_{fp}$$

$$S_{fa} = 0.5 W_R h_R + 0.5 W_L h_L + S_c$$

According to the deposition plan creation method, an accurate bead height may be obtained even when the weld bead overhangs or is obliquely deposited.

(6) The deposition plan creation method according to (4) or (5), in which
when a deposition height of the plurality of bead models whose bead heights are modified in the bead deposition portion is lower than a height of the target shape corresponding to the bead deposition portion, the bead model is further added to the bead deposition portion until the height of the target shape is exceeded.

According to the deposition plan creation method, the bead height may be accurately predicted even when the bead height after the deposition does not reach the expected height due to the dripping, and thus, the weld bead may be added and formed to ensure the required deposition height of the weld bead.

The present application is based on a Japanese Patent Application (Patent Application No. 2020-180780) filed on Oct. 28, 2020, the contents of which are incorporated herein by reference.

REFERENCE SIGNS LIST 11 additive manufacturing device
13 controller
15 power supply device
17 torch
19 welding robot
21 filler metal feeding unit
23 base plate
25 additively-manufactured object
31 CAD/CAM unit
33 track calculation unit
35 storage unit
37 control unit
41 bead deposition portion
45 bead forming surface
47 remaining portion
49 dripping portion
51 upper side
53 lower side
55 lateral side
57 lateral side
61 target shape
63 overlapping portion
65 gap
100 manufacturing apparatus for additively-manufactured object

The invention claimed is:

1. A deposition plan creation method for creating a deposition plan in which a bead formation pass and a welding condition for weld beads obtained by melting and solidifying a filler metal when an additively-manufactured object is manufactured by depositing the weld beads are set, the deposition plan creation method comprising:
setting a target shape from three-dimensional shape data of the additively-manufactured object;
slicing the set target shape into a plurality of bead models having shapes corresponding to the weld beads;
predicting, according to the welding condition of the weld beads, a dripping amount of the filler metal that drips to a lower layer during bead formation in a bead deposition portion in which the bead models vertically overlap one another among the plurality of bead models;
determining a modified bead height of each of the bead models in the bead deposition portion according to the predicted dripping amount; and
storing the deposition plan for an additive manufacturing device to manufacture the additively-manufactured object using the plurality of bead models including the bead model with the modified bead height in a memory.

2. The deposition plan creation method according to claim 1, wherein the welding condition includes a travel speed for forming the weld beads.

3. The deposition plan creation method according to claim 2, further comprising:
preparing a database including information representing a relationship between the travel speed during the bead formation and the dripping amount of the filler metal during the bead formation,
wherein predicting the dripping amount includes obtaining the dripping amount corresponding to the travel speed during the bead formation from the database based on the travel speed.

4. The deposition plan creation method according to claim 3, wherein in a cross section perpendicular to a bead forming direction, each of the bead models deposited in a plurality of layers has a remaining portion representing a region to be built up from a bead forming surface, and a dripping portion representing a dripping region provided only when the dripping region drips downward from the bead forming surface, the remaining portion is a trapezoidal region having an upper side and a lower side parallel to each other and a pair of lateral sides, and having the longer lower side than the upper side, the dripping portion is disposed below the lower side of the remaining portion of the bead model at an i-th layer, and includes one or two triangular regions formed along one lateral side or both lateral sides of the remaining portion of the bead model at an (i−1)-th layer disposed below the bead model at the i-th layer, and a shape of the bead model is determined by using the following formula:

$$S_e = S - S_f = S - \frac{(w_i - u_{i-1})h_{i-1}\alpha}{2} = \frac{(w_i + u_i)h_i}{2}$$

$$\tan\theta_i = \frac{2h_i}{w_i - u_i}$$

where, with respect to the bead model at the i-th layer, a total area of the bead model is set as $S$, an area of the remaining portion is set as $S_e$, a total area of the dripping portion is set as $S_f$, a length of the upper side of the remaining portion is set as $u_i$, a length of the lower side is set as $w_i$, a height is set as $h_i$, and a base angle is set as $\theta_i$, with respect to the bead model at the (i−1)-th layer, a length of the upper side of the remaining portion is set as $u_{i-1}$, a length of the lower side is set as $w_{i-1}$, and a height is set as $h_{i-1}$, and $\alpha$ represents a ratio of the area of the dripping portion to a maximum possible total area of the dripping portion.

5. The deposition plan creation method according to claim 4, wherein, in a case where the bead deposition portion in which the bead models are deposited is provided with an overhang, a shape of the bead model at the i-th layer is determined by using the following formula:

$$\tan\theta_i = \frac{4S - 4S_f}{w_i^2 - u_i^2}$$

$$S_f = S_{fa} - S_{fp}$$

$$S_{fa} = 0.5W_R h_R + 0.5W_L h_L + S_c$$

where, in a cross section perpendicular to the bead forming direction of the weld beads, in a case where the dripping portion is formed at one end of the lower side of the remaining portion, a length of a bottom side of a triangular dripping portion is set as $W_R$, and a height from the bottom side to a vertex is set as $h_R$, in a case where the dripping portion is formed at the other end of the lower side of the remaining portion, a length of a bottom side of a triangular dripping portion is set as $W_L$, and a height from the bottom side to a vertex is set as $h_L$, an area of an overlapping portion between the bead model and another surrounding bead model is set as $S_{fp}$, and a gap area formed between the remaining portion and an adjacent remaining portion is set as $S_c$.

6. The deposition plan creation method according to claim 4, wherein, when a deposition height of the plurality of bead models whose bead heights are determined in the bead deposition portion is lower than a height of the target shape corresponding to the bead deposition portion, the bead model is further added to the bead deposition portion until the height of the target shape is exceeded.

7. The deposition plan creation method according to claim 5, wherein, when a deposition height of the plurality of bead models whose bead heights are determined in the bead deposition portion is lower than a height of the target shape corresponding to the bead deposition portion, the bead model is further added to the bead deposition portion until the height of the target shape is exceeded.

* * * * *